United States Patent
Takahashi

(10) Patent No.: US 10,467,821 B2
(45) Date of Patent: Nov. 5, 2019

(54) PATH DATA GENERATION DEVICE FOR THREE-DIMENSIONAL MODELING, AND NON-TRANSITORY COMPUTER READABLE MEDIUM STORING PATH DATA GENERATION PROGRAM FOR THREE-DIMENSIONAL MODELING

(71) Applicant: FUJI XEROX CO., LTD., Tokyo (JP)

(72) Inventor: Tomonari Takahashi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/893,927

(22) Filed: Feb. 12, 2018

(65) Prior Publication Data

US 2018/0350154 A1    Dec. 6, 2018

(30) Foreign Application Priority Data

Jun. 6, 2017    (JP) .................................. 2017-111861

(51) Int. Cl.
| | |
|---|---|
| *G06T 19/20* | (2011.01) |
| *G06T 17/20* | (2006.01) |
| *G06T 19/00* | (2011.01) |
| *B33Y 50/00* | (2015.01) |
| *G06T 17/00* | (2006.01) |

(52) U.S. Cl.
CPC .............. *G06T 19/20* (2013.01); *B33Y 50/00* (2014.12); *G06T 17/20* (2013.01); *G06T 19/00* (2013.01); *G06T 2219/008* (2013.01); *G06T 2219/2021* (2013.01)

(58) Field of Classification Search
CPC ...... G06T 17/00; G06T 2200/04; G06T 19/20
USPC ........................................................... 700/118
See application file for complete search history.

(56) References Cited

U.S. PATENT DOCUMENTS

| 2006/0127648 A1* | 6/2006 | De Luca ................... A61B 8/12 |
| | | 428/174 |
| 2009/0097728 A1* | 4/2009 | Lee ........................... G06T 7/11 |
| | | 382/131 |
| 2015/0258770 A1 | 9/2015 | Chan et al. |

FOREIGN PATENT DOCUMENTS

| JP | 2004-102979 A | 4/2004 |
| JP | 2016-182745 A | 10/2016 |

(Continued)

OTHER PUBLICATIONS

Ding, D., et al., "A tool-path generation strategy for wire and arc additive manufacturing", The International Journal of Advanced Manufacturing Technology, vol. 73, No. 1-4, 2014, pp. 173-183, XP055472255.

(Continued)

*Primary Examiner* — Michael J Brown
(74) *Attorney, Agent, or Firm* — Sughrue Mion, PLLC

(57) ABSTRACT

A path data generation device for three-dimensional modeling includes: a first generator that generates two-dimensional data of slice planes obtained by slicing three-dimensional shape data for which multiple different model materials is specified; and a second generator that continuously outputs the multiple model materials in accordance with a path generated based on the two-dimensional data, and when a three-dimensional shape is modeled using a three-dimensional modeling method of modeling three-dimensional shape data, generates path data indicating the path so that a same model material continues along the path.

11 Claims, 9 Drawing Sheets

(56) References Cited

FOREIGN PATENT DOCUMENTS

WO   2016/153047 A1   9/2016
WO    2016171649 A1   10/2016

OTHER PUBLICATIONS

Hergel, J., et al., "Clean color: Improving multi-filament 3D prints", Computer Graphics Forum, vol. 33, No. 2, 2014, 10 pages, XP055420761.
Shin,Ki-Hoon., et al., "A method for the design and fabrication of heterogeneous objects", Materials & Design, vol. 24, No. 5, 2003, pp. 339-353, XP9508020.
Communication dated Sep. 24, 2018 from the European Patent Office in counterpart application No. 18160373.9.

* cited by examiner

PATH DATA GENERATION DEVICE FOR THREE-DIMENSIONAL MODELING, AND NON-TRANSITORY COMPUTER READABLE MEDIUM STORING PATH DATA GENERATION PROGRAM FOR THREE-DIMENSIONAL MODELING

CROSS-REFERENCE TO RELATED APPLICATIONS

This application is based on and claims priority under 35 USC 119 from Japanese Patent Application No. 2017-111861 filed on Jun. 6, 2017.

BACKGROUND

Technical Field

The present invention relates to a path data generation device for three-dimensional modeling, and a non-transitory computer readable medium storing a path data generation program for three-dimensional modeling.

SUMMARY

According to an aspect of the invention, there is provided a path data generation device for three-dimensional modeling including: a first generator that generates two-dimensional data of slice planes obtained by slicing three-dimensional shape data for which multiple different model materials is specified; and a second generator that continuously outputs the multiple model materials in accordance with a path generated based on the two-dimensional data, and when a three-dimensional shape is modeled using a three-dimensional modeling method of modeling three-dimensional shape data, generates path data indicating the path so that a same model material continues along the path.

BRIEF DESCRIPTION OF THE DRAWINGS

Exemplary embodiments of the present invention will be described in detail based on the following figures, wherein.

DETAILED DESCRIPTION

Hereinafter, an exemplary embodiment for carrying out the present disclosure will be described in detail with reference to the drawings.

First Exemplary Embodiment

First, a path data generation device for three-dimensional modeling according to a first exemplary embodiment will be described.

Figure 1:
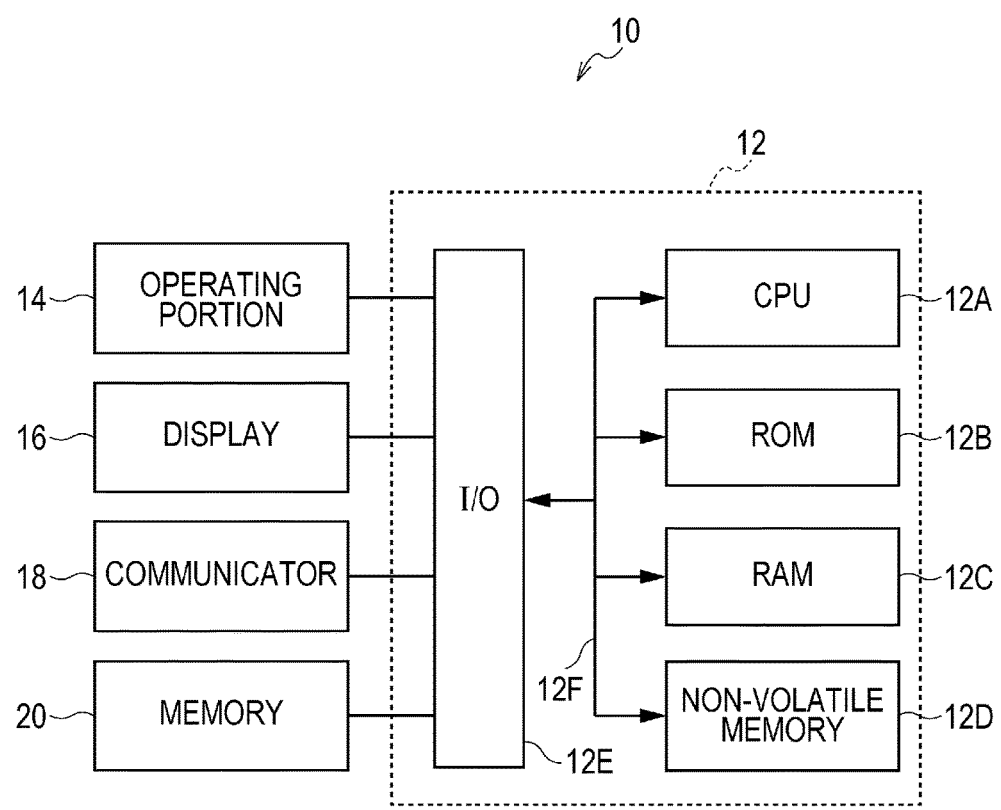
FIG. 1 is a diagram illustrating a configuration example of an editing device.

First, referring to FIG. 1, the configuration of a path data generation device (hereinafter simply referred to as a "generation device") 10 for three-dimensional modeling according to this exemplary embodiment will be described.

The generation device 10 is configurated by, for instance, a personal computer, and includes a controller 12. The controller 12 includes a central processing unit (CPU) 12A, a read only memory (ROM) 12B, a random access memory (RAM) 12C, a non-volatile memory 12D, and an input/output (I/O) interface 12E. The CPU 12A, the ROM 12B, the RAM 12C, the non-volatile memory 12D, and the I/O 12E are connected to each other via a bus 12F.

Also, the I/O 12E is connected to an operating portion 14, a display 16, a communicator 18, and a memory 20. It is to be noted that the CPU 12A is an example of the first generator, the second generator, and the ratio calculator.

The operating portion 14 includes an input device such as, a mouse, a keyboard, or a touch panel, that receives an instruction from a user of the generation device 10, for instance.

The display 16 includes a display device, such as a liquid crystal display and an organic electro luminescence (EL) display, for instance.

The communicator 18 is connected to a communication line, for instance, the Internet or a local area network (LAN), and has an interface for performing data communication with an external device such as a personal computer connected to the communication line.

The memory 20 includes a non-volatile memory device such as a hard disk, and stores three-dimensional shape data and the like generated by the generation device 10.

Figure 2:
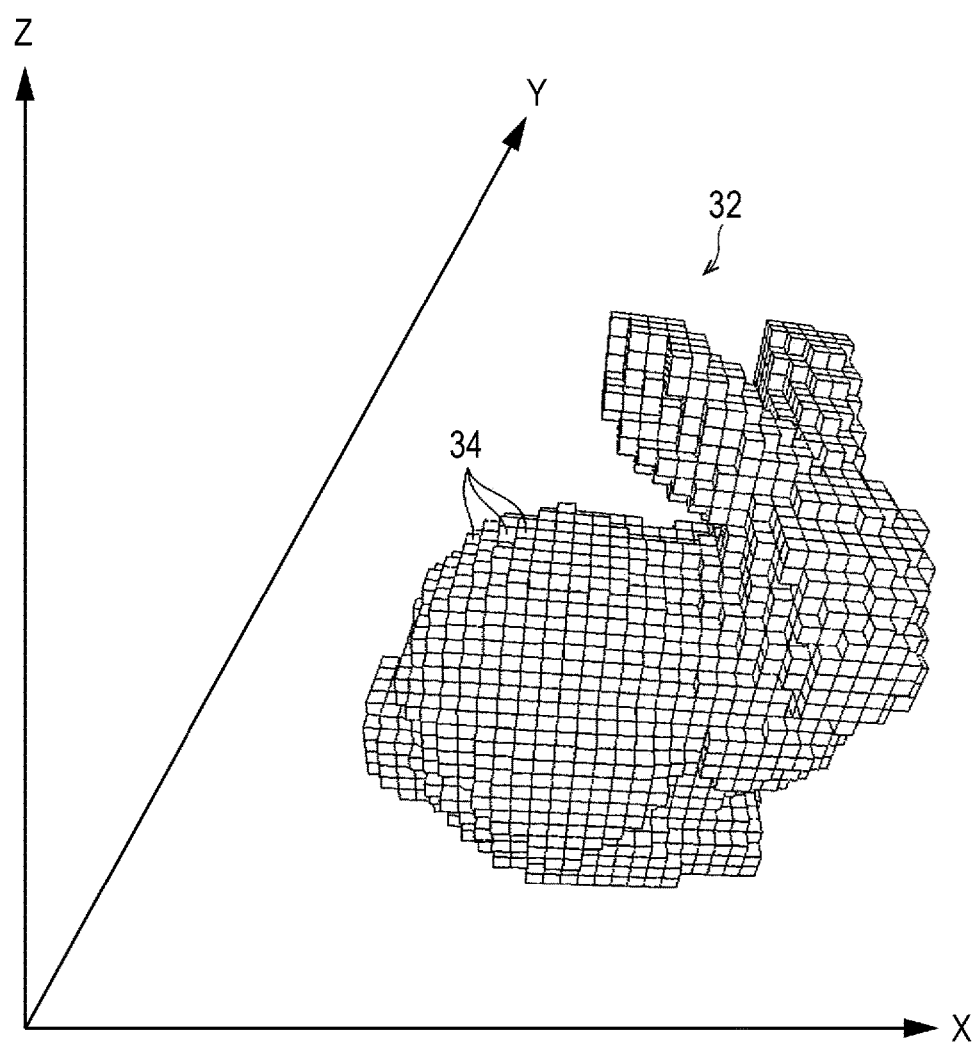
FIG. 2 is a figure illustrating an example of a three-dimensional shape.

FIG. 2 is a figure illustrating an example of a three-dimensional shape 32 represented by three-dimensional shape data. As illustrated in FIG. 2, the generation device 10 represents the three-dimensional shape 32 using three-dimensional coordinates (hereinafter referred to as a "three-dimensional coordinate space") formed by X-axis, Y-axis, and Z-axis.

In this exemplary embodiment, a case will be described where as a data format for three-dimensional shape data, the data format that represents the three-dimensional shape 32 by a set of voxels 34 is used. However, another data format may be used.

Here, the voxels 34 are each a basic element of the three-dimensional shape 32, and for instance, a rectangular parallelepiped is used. However, without being limited to the rectangular parallelepiped, a sphere or a cylinder may be used. A desired three-dimensional shape 32 is represented by stacking the voxels 34. Also, for each voxel 34, an attribute indicating a property of the voxel 34, for instance, a color, a material, a strength, a material quality, a texture, an electrical conductivity, or a thermal conductivity is specified, and the color or the material of the three-dimensional shape 32 is represented by presence of the voxel 34 and the attribute of the voxel 34.

Here, the "material quality" includes at least one of information indicating a genre of material such as resin, metal, or rubber, information indicating a material name such as ABS, PLA, information indicating a product name, a product number of a commercially available material, information indicating a material such as a material name an abbreviation, and a number which are defined in a standard such as ISO, JIS, and information indicating material characteristics such as a thermal conductivity, an electrical conductivity, and magnetism.

Furthermore, the "texture" refers to an attribute indicating not only a color, but also appearance or touch of three-dimensional shape data, such as a reflectivity, a transmittance, gloss, and a surface property thereof.

It is to be noted that the attribute includes a distribution pattern which is set using at least one of a period, a mathematical expression, and another three-dimensional shape data. The distribution pattern includes at least one of repeat of a constant period, gradation, representation by a slope, an inflection point or the like expressed by a mathematical expression, continuous modification of the color, material, or texture of three-dimensional shape data in accordance with another three-dimensional shape data, and filling or continuously modifying a specified range of three-dimensional shape data with a specified pattern.

As described above, the three-dimensional shape 32 is represented by a set of voxels 34, and is specifically represented by, for instance, an element value of X, Y, Z coordinates in a three-dimensional coordinate space. Let (X, Y, Z) represent coordinates in a three-dimensional coordinate space, then when a voxel 34 is present at the coordinates (X, Y, Z), "(X, Y, Z)=1" is set. On the other hand, when a voxel 34 is not present at the coordinates (X, Y, Z), the three-dimensional shape 32 is represented by setting "(X, Y, Z)=0". In other words, three-dimensional shape data includes the element value of the coordinates (X, Y, Z), which indicates the presence or absence of the voxel 34, and an attribute associated with the voxel 34 having an element value of "1".

It is to noted that the three-dimensional shape 32 is not necessarily represented by coordinates (X, Y, Z) in a three-dimensional coordinate space. For instance, the three-dimensional shape 32 may be represented by index numbers each uniquely associated with coordinates (X, Y, Z). In this case, for instance when the value associated with an index number is "1", this means that a voxel 34 is present at the position indicated by the index number.

In addition, no restriction is imposed on the shape of the three-dimensional shape 32, and the three-dimensional shape 32 may be any shape as long as the shape is represented by using three-dimensional shape data.

Next, the operation of generation processing of three-dimensional shape data representing a three-dimensional shape will be described.

Figure 3:
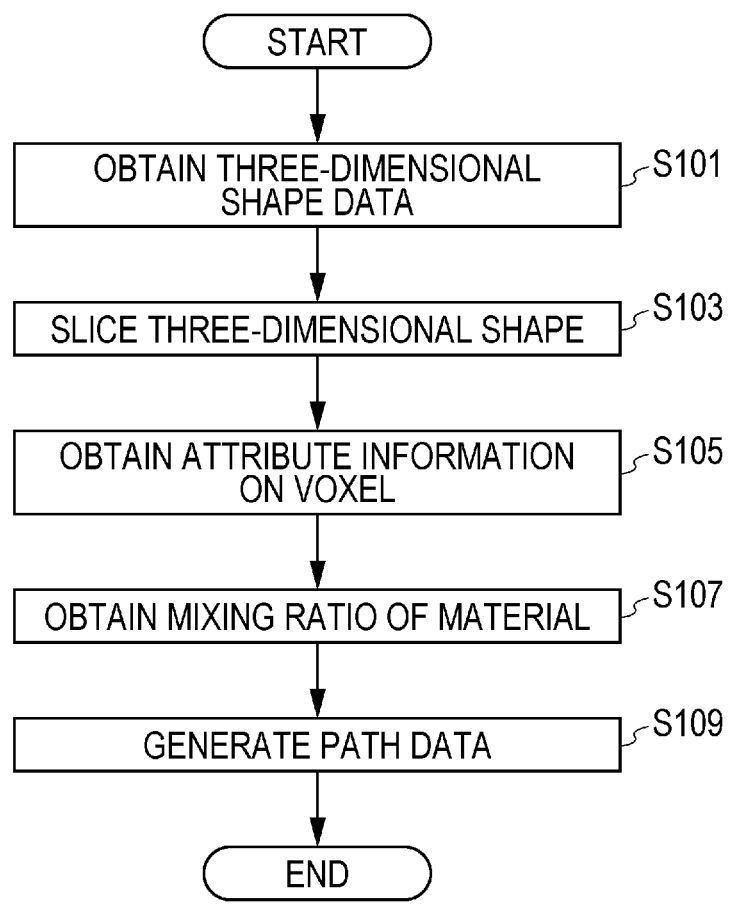
FIG. 3 is a flowchart illustrating an example of a flow of generation processing of three-dimensional shape data according to a first exemplary embodiment.

FIG. 3 is a flowchart illustrating an example of a flow of generation processing performed by the generation device 10. An editing program, which defines the generation processing of three-dimensional shape data, is pre-stored in the ROM 12B, and for instance, when receiving an edit start instruction for a three-dimensional shape from a user, the CPU 12A reads the editing program from the ROM 12B and executes the editing program.

Figure 4:
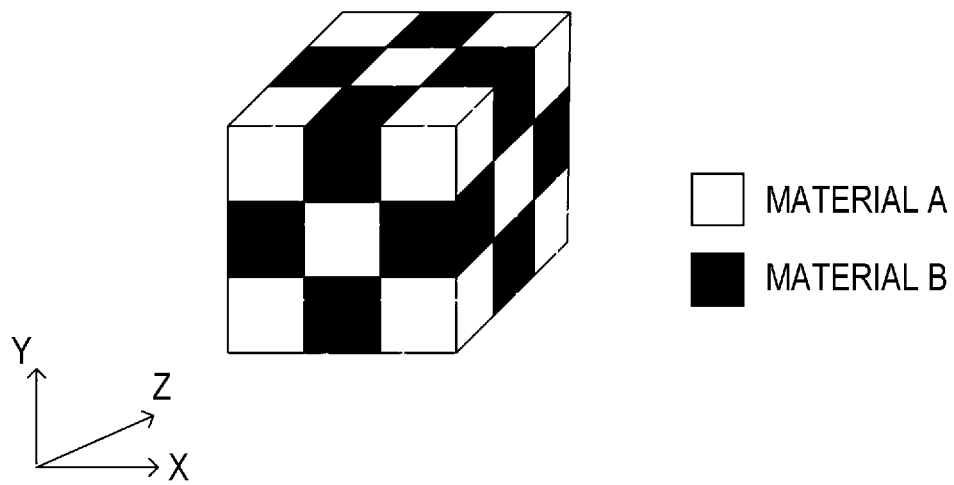
FIG. 4 is a figure illustrating an example of a mixing method when materials are mixed into a three-dimensional shape according to a mixing ratio.

It is to noted that in this exemplary embodiment, a case will be described where attribute information indicating one type of model material (hereinafter simply referred to as a "material") is assigned to each of voxels included in the three-dimensional shape. For instance, as illustrated in FIG. 4, a mixing ratio of a material is set to each region (for instance, the region of a cube with each side having three voxels arranged) having a predetermined size in a three-dimensional shape. Also, one of materials is assigned to each of voxels 42 as attribute information correspondingly to the mixing ratio of each material in the region having a predetermined size, the voxels 42 being included in the region having a predetermined size.

In the example illustrated in FIG. 4, the mixing ratio of each of material A and material B in the region having a predetermined size is set to approximately 50%, and attribute information indicating the material A (indicated by white color in FIG. 4), or attribute information indicating the material B (indicated by black color in FIG. 4) is assigned to each voxel 42 included in the region.

Here, when a mixing ratio of each of multiple materials is set, a material distribution is represented by the voxels included in the region having a predetermined size, thereby reusing the region and making it possible to set a mixing ratio of each material in multiple ranges in three-dimensional shape data. However, it is not indispensable to predetermine a size. For instance, when multiple materials are gradationally distributed for the entire three-dimensional shape from the uppermost portion to the lowermost portion, it is not necessary to prepare multiple patterns of mixing ratio represented by a distribution of voxels in the region having a predetermined size and to set the entire distribution by a combination of the regions, and the entire three-dimensional shape may be regarded as a region, and a distribution of voxels may be set. Also, after the entire three-dimensional shape is regarded as a region and a distribution of voxels is set, a region having an arrangement pattern of similar voxels may be detected, and the same pattern may be used in common.

Figure 5:
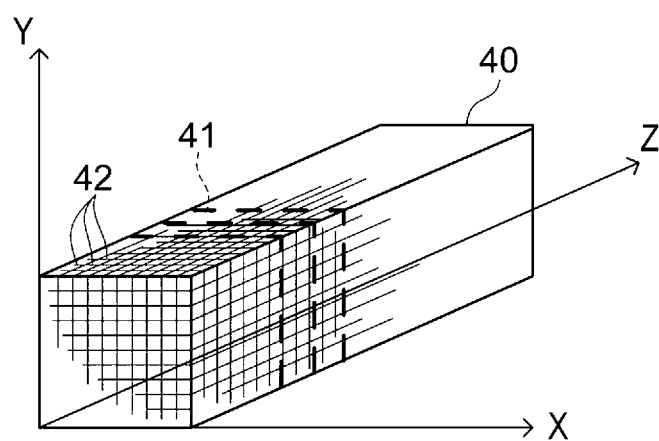
FIG. 5 is a figure illustrating an example of a three-dimensional shape.

In step S101, the CPU 12A obtains three-dimensional shape data for which path data is to be generated. In this exemplary embodiment, as illustrated in FIG. 5 as an example, a case will be described where three-dimensional shape data for which path data is to be generated is three-dimensional shape data which is represented by a set of voxels 42, and which indicates a rectangular parallelepiped three-dimensional shape 40.

Figure 6:
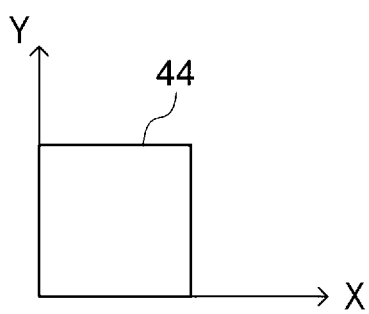
FIG. 6 is a figure illustrating an example of a method of slicing a three-dimensional shape.

In step S103, the CPU 12A slices the three-dimensional shape 40 by multiple planes horizontal to stacking planes when the three-dimensional shape data is modeled. In this exemplary embodiment, as illustrated in FIG. 5 as an example, when the XY-plane serves as a stacking plane and the Z direction serves as a stacking direction (height), the three-dimensional shape 40 is sliced by multiple slicing planes 41 parallel to the XY-plane horizontal to the stacking plane. As illustrated in FIG. 6 as an example, multiple slice images 44 having a thickness of a stack thickness (pitch) of a modeling device are generated.

In step S105, for each of the slice images 44, the CPU 12A obtains attribute information of each voxel 42 included in the slice image 44 based on the two-dimensional data of the slice image 44. In this exemplary embodiment, the CPU 12A obtains information on material, which is assigned to each voxel 42 included in the slice image 44 as the attribute information.

Figure 7:
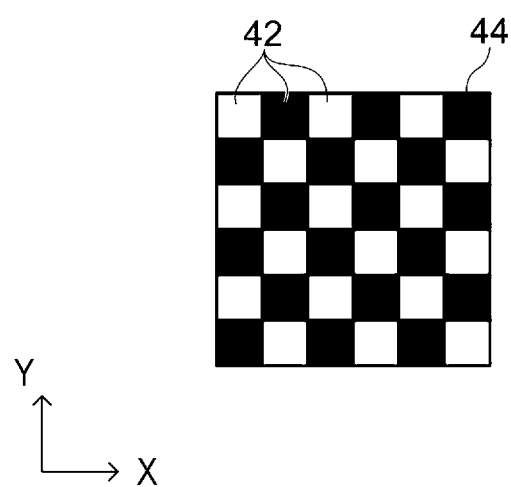
FIG. 7 is a figure illustrating an example of a slice image obtained by slicing an original three-dimensional image.

In this exemplary embodiment, as illustrated in FIG. 7 as an example, a case will be described where one of the attribute information indicating the material A (indicated by white color in FIG. 7) and the attribute information indicating the material B (indicated by black color in FIG. 7) is assigned to each voxel 42 included in the three-dimensional shape 40. Needless to say, the attribute information assigned may indicate three or more types of materials.

In step S107, the CPU 12A calculates a mixing ratio of each of the materials included in the entire slice image 44 from the attribute information assigned to each voxel 42 included in the slice image 44. In this exemplary embodiment, as described above, attribute information indicating one type of material is assigned to each voxel 42 included in the three-dimensional shape 40. Thus, a mixed ratio is calculated by the number of voxels 42 to which corresponding one of materials is assigned.

In step S109, for each slice image 44, the CPU 12A generates a path in which the mixing ratio of each material included in the slice image 44 is the same as the mixing ratio calculated in step S107 from the attribute information assigned to the voxels 42 included in the slice image 44, and each material is continuously outputted as much as possible, then completes execution of the program for the generation processing. It is to be noted that the above-mentioned "the same as the mixing ratio" is not limited to the case of completely the same, and may not be completely the same as long as the qualities are the same.

Figure 8A:
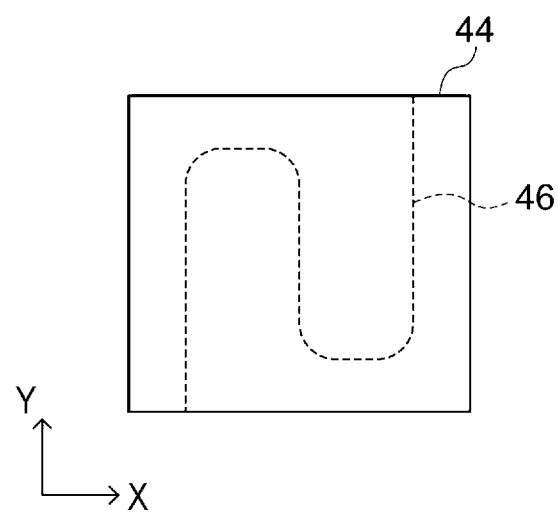
FIG. 8A is a figure illustrating an example of a path of a material generated in a slice image.

As illustrated in FIG. 8A as an example, for each slice image 44, the CPU 12A generates a path 46 of each of the materials based on the slice image 44. When multiple materials are included in the three-dimensional shape 40, the CPU 12A generates a path for each of the materials. For instance, when the material A and the material B are included in the three-dimensional shape 40, as illustrated in FIG. 8B as an example, the CPU 12A generates a path 46A of the material A and a path 46B of the material B.

Figure 8B:
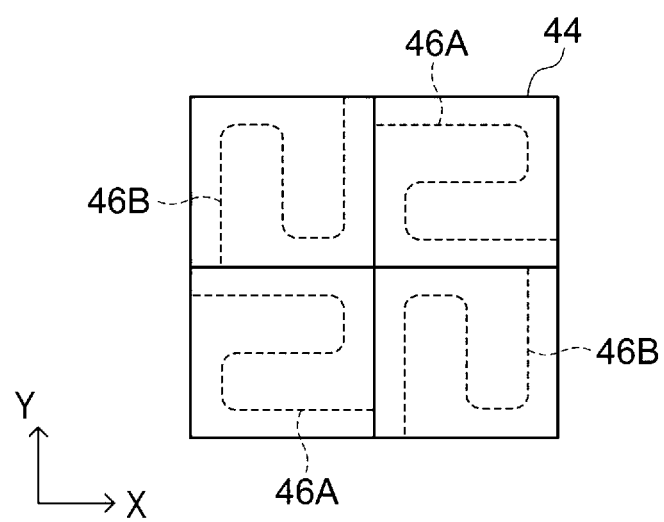
FIG. 8B is a figure illustrating another example of a path of a material generated in a slice image.
Figure 9A:
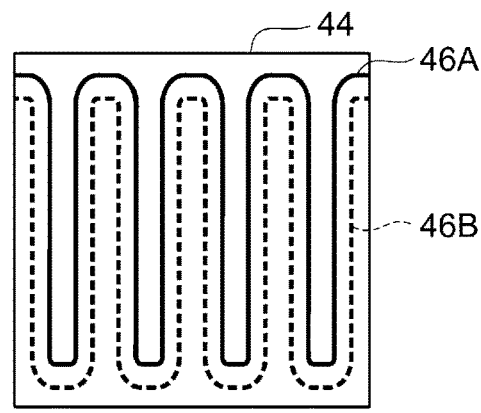
FIG. 9A is a figure illustrating another example of a path of a material generated in a slice image.
Figure 9B:
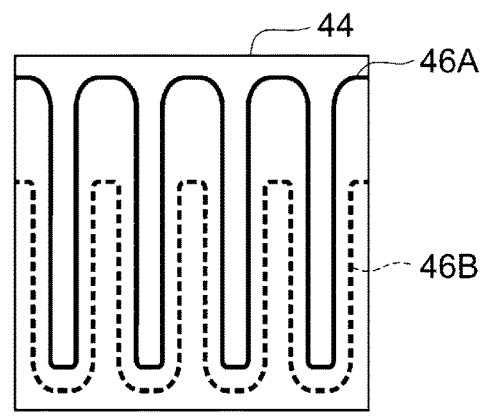
FIG. 9B is a figure illustrating another example of a path of a material generated in a slice image.
Figure 9C:
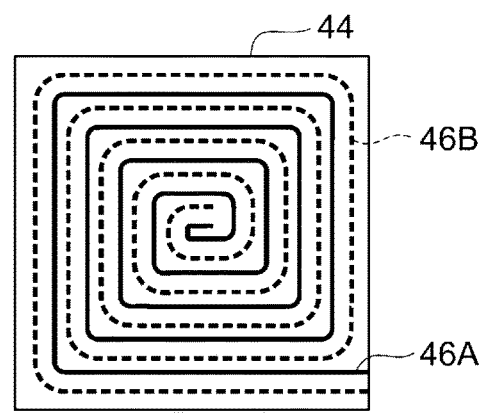
FIG. 9C is a figure illustrating another example of a path of a material generated in a slice image.

Here, FIG. 8B is an example of a path generation pattern in which when the material A and the material B are included in the three-dimensional shape 40, the slice image 44 is divided into parts with the calculated mixing ratio, and each part is filled with the same material so that eventually, the mixing ratio of the material in a range matches the calculated mixing ratio. However, the path generation pattern is not limit to this. For instance, as illustrated in FIGS. 9A and 9B, the entire path may be formed in a comb-like shape without being divided into parts, or as illustrated in FIG. 9C, the path may form a spiral on the entire slice image 44 so that circumferential portions appear alternately, or the path may combine multiple patterns by changing a pattern in the middle of the path.

In this exemplary embodiment, at least one of the following may be adjusted based on the mixing ratio of each material: the number of lines, the thickness of line, the number of turns of line, the distance to each turn of line, the interval between lines, the density of a model material, and the amount of output of the model material in a path along which each material is continuously outputted. In this case, the shape of the path, along which each material is continuously outputted, is adjusted so that the mixing ratio of each material included in the slice image 44 matches the mixing ratio calculated in step S107 from the attribute information assigned to the voxels 42 included in the slice image 44.

It is to be noted that in some cases, it is desirable that a path along which each material is continuously outputted be devised differently depending on the modeling device for a three-dimensional shape. For instance, in the fused deposition modeling (FDM), a material contracts when cooled and solidified, thus in order to uniformize the degree of contraction and a cooling time, a path can be generated, which detours as much as possible. Like this, generation of a path is devised, for instance, paths are set to be close or far from each other as much as possible, a pattern is generated so that paths are not parallel between upper and lower stacking planes, or the thicknesses and interval of lines between upper and lower stacking planes are changed. In this exemplary embodiment, when a path is generated to achieve the calculated mixing ratio, these devised points, which are different depending on the modeling device, are taken into consideration.

Figure 10:
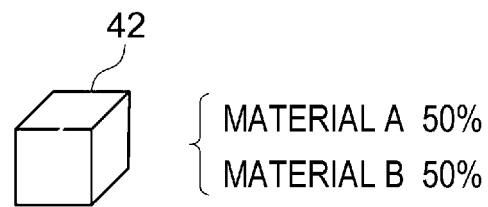
FIG. 10 is a figure illustrating another example of a mixing method when materials are mixed into a three-dimensional shape according to a mixing ratio.
Figure 10:
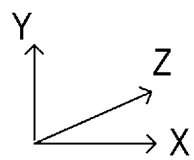

Also, in this exemplary embodiment, a case has been described where attribute information indicating one type of material is assigned to each of the voxels 42. However, as illustrated in FIG. 10, the mixing ratios of multiple materials as the attribute information may be assigned to each voxel 42 included in the three-dimensional shape data. In this case, the mixing ratio of each material included in the slice image 44 may be calculated based on the mixing ratio of each material in each voxel 42 included in the slice image 44.

In this manner, the generation device 10 generates two-dimensional data of slice planes obtained by slicing three-dimensional shape data which is represented by a set of voxels, and for which multiple different model materials are specified. Also, the generation device 10 continuously outputs a model material in accordance with a path generated based on the two-dimensional data, and when a three-dimensional shape is modeled using a three-dimensional modeling method of modeling three-dimensional shape data, generates path data indicating the path so that the same model material continues along the path.

Second Exemplary Embodiment

Next, a path data generation device for three-dimensional modeling according to a second exemplary embodiment will be described.

In the first exemplary embodiment, a case has been described where three-dimensional shape data, which is represented by a set of voxels and for which path data is to be generated, is obtained. In contrast, in the second exemplary embodiment, a case will be described where three-dimensional shape data, which is not represented by a set of voxels and for which path data is to be generated, is obtained.

The configuration of the generation device according to the second exemplary embodiment is the same as the configuration of the generation device 10 according to the first exemplary embodiment, thus a description of each component is omitted.

Next, the operation of generation processing of three-dimensional shape data representing the three-dimensional shape 32 will be described.

Figure 11:
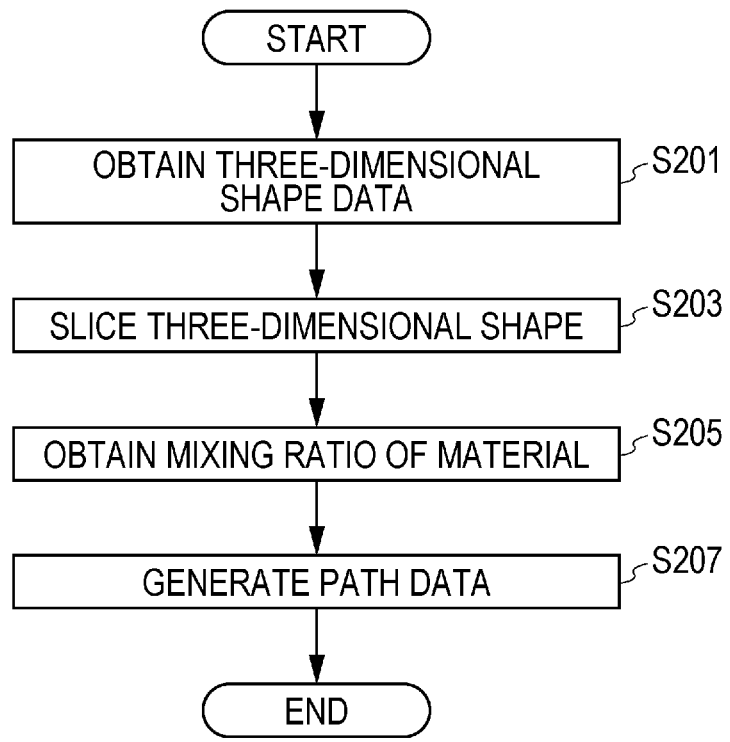
FIG. 11 is a flowchart illustrating an example of a flow of three-dimensional shape data generation processing according to a second exemplary embodiment.

FIG. 11 is a flowchart illustrating an example of a flow of the generation processing performed by the generation device 10. An editing program, which defines the generation processing of three-dimensional shape data, is pre-stored in the ROM 12B, and for instance, when receiving an edit start instruction for the three-dimensional shape 32 from a user, the CPU 12A reads the editing program from the ROM 12B and executes the editing program.

In step S201, the CPU 12A obtains three-dimensional shape data for which path data is to be generated. In this exemplary embodiment, three-dimensional shape data, which is not represented by a set of voxels, such as mesh data which is formed for each material, is obtained. In this exemplary embodiment, a case will be described where the mixing ratio of each material inside the three-dimensional shape indicated by the obtained three-dimensional shape data is pre-specified.

Here, when the mixing ratio of each material inside the three-dimensional shape is not uniform, the mixing ratio may be specified, for instance, by a pattern such as a gradation, a period, a mathematical expression or the like. In this case, when a mixing ratio of each material for each slice layer is calculated, the ratio has to be calculated from a pattern specified for each slice layer or each calculation portion, a period, a mathematical expression or the like. In this case, the three-dimensional shape data is pre-converted into voxels in an arrangement having material information that allows a pattern, a period, a mathematical expression or the like to be reproduced, and the first exemplary embodiment is thereby applicable. It is to be noted that the entire three-dimensional shape data may be converted into voxels, or only the portion, for which the mixing ratio is specified by a pattern, a period, a mathematical expression or the like, may be converted into voxels. Also, conversion into voxels may be made at the timing of obtaining the three-dimensional shape data in step S201, or when a mixing ratio is obtained in step S205, conversion into voxels may be made so that a pattern, a period, a mathematical expression or the like specified for each slice layer may be represented by the voxels.

Figure 12:
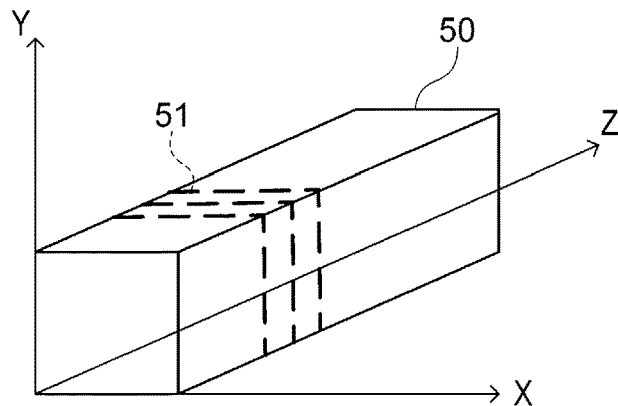
FIG. 12 is a figure illustrating an example of a method of slicing a three-dimensional shape.
Figure 13:
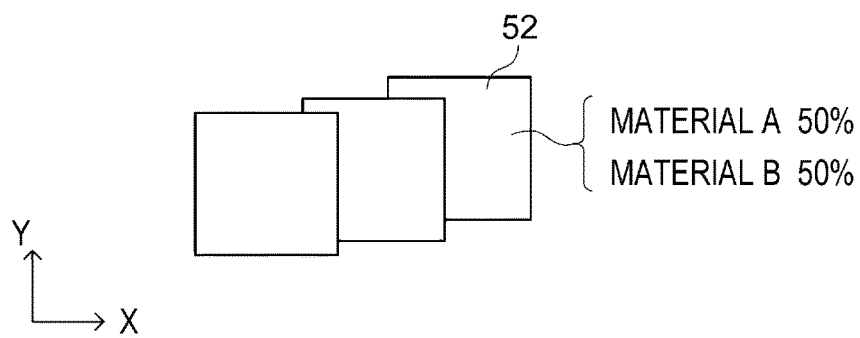
FIG. 13 is a figure illustrating an example of a slice image obtained by slicing an original three-dimensional image.

In step S203, the CPU 12A slices the three-dimensional shape 40 by multiple planes horizontal to stacking planes when the three-dimensional shape data is modeled. In this exemplary embodiment, as illustrated in FIG. 12 as an example, when the XY-plane serves as a stacking plane and the Z direction serves as a stacking direction (height), a rectangular parallelepiped three-dimensional shape 50 is sliced by multiple slicing planes 51 parallel to the XY-plane horizontal to the stacking plane. As illustrated in FIG. 13 as an example, multiple slice images 52 having a thickness of a stack thickness (pitch) of the modeling device are generated.

In step S205, for each of the slice images 52, the CPU 12A calculates a mixing ratio of each of the materials included in the slice image 52 based on the two-dimensional data of the slice image 52.

In step S207, for each slice image 52, the CPU 12A generates a path in which the mixing ratio of each material included in the slice image 52 is the same as the mixing ratio calculated in step S205, and each material is continuously outputted as much as possible, then completes execution of the program for the generation processing.

Figure 14:
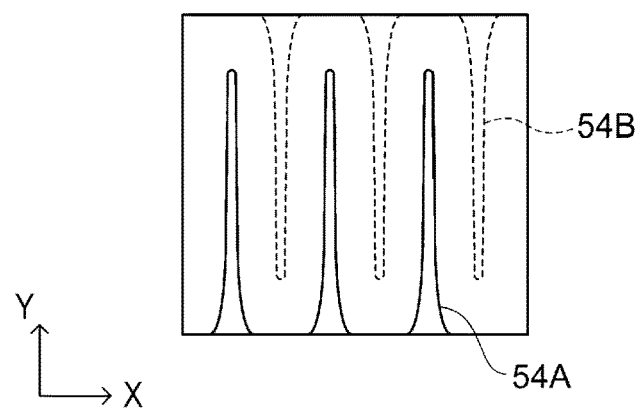
FIG. 14 is a figure illustrating an example of a path of a material generated in a slice image.

As illustrated in FIG. 13 as an example, when a specific region included in the slice image 52 is configured by the material A and the material B with 50% each, as illustrated in FIG. 14 as an example, a path 54A of the material A and a path 54B of the material B are generated so that the mixing ratios of the material A and the material B are the same, and each of the material A and the material B is continuously outputted as much as possible.

In this manner, the generation device 10 generates two-dimensional data of slice planes obtained by slicing three-dimensional shape data which is not represented by a set of voxels, and for which multiple different model materials are specified. Also, the generation device 10 continuously outputs a model material in accordance with a path generated based on the two-dimensional data, and when a three-dimensional shape is modeled using a three-dimensional modeling method of model three-dimensional shape data, generates path data indicating the path so that the same model material continues along the path.

Although the present disclosure has been described above using the exemplary embodiments, the present disclosure is not limited to the scope of the exemplary embodiment. Various modifications or improvements may be made to the exemplary embodiments without departing from the gist of the present disclosure, and the exemplary embodiment to which the modifications or improvements are made is also included in the technical scope of the present disclosure.

For instance, the generation processing of three-dimensional shape data illustrated in FIG. 3 may be implemented by hardware such as an application specific integrated circuit (ASIC). In this case, faster processing is achieved as compared with the case where the generation processing is implemented by software.

Also, in the exemplary embodiments, although a case has been described where the editing program for three-dimensional shape data is installed in the ROM 12B, the exemplary embodiments are not limited to this. The editing program for three-dimensional shape data according to the exemplary embodiment of the invention may be provided in the form of computer readable medium. For instance, the editing program according to the exemplary embodiment of the invention may be provided in the form of recording in an optical disk such as a compact disc (CD)-ROM and a digital versatile disc (DVD)-ROM or in a semiconductor memory such as a universal serial bus (USB) memory and a memory card. Also, the editing program for three-dimensional shape data according to the exemplary embodiment of the invention may be obtained from an external device via a communication line connected to the communicator 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A path data generation device for three-dimensional modeling, the path data generation device comprising:
   at least one processor configured to execute:
      a first generator that generates two-dimensional data of slice planes obtained by slicing three-dimensional shape data for which a plurality of different model materials are specified; and
      a second generator that continuously outputs the plurality of model materials in accordance with a path generated based on the two-dimensional data, and if a three-dimensional shape is modeled using a three-dimensional modeling method of modeling three-dimensional shape data, then generates path data indicating the path so that a same model material continues along the path, wherein the second generator generates the path data by adjusting a shape of the path in the slice planes so that a mixing ratio of the plurality of model materials, which is specified in the three-dimensional shape data, is maintained before and after the adjustment.

2. The path data generation device for three-dimensional modeling according to claim 1, wherein the second generator adjusts the shape of the path by adjusting at least one of a number of lines of the path, a thickness of the lines, a number of turns of the lines, a distance to the turns of the lines, an interval between the lines, a density of the plurality of model materials, and an amount of output of the plurality of model materials.

3. The path data generation device for three-dimensional modeling according to claim 2, wherein the at least one processor is further configured to execute:

a ratio calculator that calculates a mixing ratio of each of the plurality of model materials from a distribution of the plurality of model materials specified in the three-dimensional shape data, wherein the second generator generates the path data by adjusting the shape of the path in the slice planes so that the mixing ratio of the plurality of model materials matches the mixing ratio calculated by the ratio calculator.

4. The path data generating device for three-dimensional modeling according to claim 3, wherein the three-dimensional shape is configured by a plurality of voxels in which information on the plurality of model materials is defined, wherein a distribution of the plurality of model materials is represented by an arrangement of the plurality of voxels, and wherein a mixing ratio of each of the plurality of model materials represented by the arrangement of the plurality of voxels is calculated.

5. The path data generating device for three-dimensional modeling according to claim 3, wherein the ratio calculator converts the three-dimensional shape data not configured by the plurality of voxels into voxels, and calculates a mixing ratio of each of the plurality of model materials represented by an arrangement of the plurality of voxels.

6. The path data generating device for three-dimensional modeling according to claim 2, wherein the three-dimensional shape is configured by a plurality of voxels in which information on the plurality of model materials is defined, wherein a distribution of the plurality of model materials is represented by an arrangement of the plurality of voxels, and wherein a mixing ratio of each of the plurality of model materials represented by the arrangement of the plurality of voxels is calculated.

7. The path data generating device for three-dimensional modeling according to claim 1, wherein the at least one processor is further configured to execute:

a ratio calculator that calculates a mixing ratio of each of the plurality of model materials from a distribution of the plurality of model materials specified in the three-dimensional shape data, wherein the second generator generates the path data by adjusting the shape of the path in the slice planes so that the mixing ratio of the plurality of model materials matches the mixing ratio calculated by the ratio calculator.

8. The path data generating device for three-dimensional modeling according to claim 7, wherein the three-dimensional shape is configured by a plurality of voxels in which information on the plurality of model materials is defined, wherein a distribution of the plurality of model materials is represented by an arrangement of the plurality of voxels, and wherein a mixing ratio of each of the plurality of model materials represented by the arrangement of the plurality of voxels is calculated.

9. The path data generating device for three-dimensional modeling according to claim 7, wherein the ratio calculator converts the three-dimensional shape data not configured by the plurality of voxels into voxels, and calculates a mixing ratio of each of the plurality of model materials represented by an arrangement of the plurality of voxels.

10. The path data generating device for three-dimensional modeling according to claim 1, wherein the three-dimensional shape is configured by a plurality of voxels in which information on the plurality of model materials is defined, wherein a distribution of the plurality of model materials is represented by an arrangement of the plurality of voxels, and wherein a mixing ratio of each of the plurality of model materials represented by the arrangement of the plurality of voxels is calculated.

11. A non-transitory computer readable medium storing a path data generation program causing a computer to execute a process, the process comprising:

generating two-dimensional data of slice planes obtained by slicing three-dimensional shape data for which a plurality of different model materials is specified; and continuously outputting the plurality of model materials in accordance with a path generated based on the two-dimensional data, and if a three-dimensional shape is modeled using a three-dimensional modeling method of modeling three-dimensional shape data, then generating path data indicating the path so that a same model material continues along the path;

wherein the generating path data comprises generating the path data by adjusting a shape of the path in the slice planes so that a mixing ratio of the plurality of model materials, which is specified in the three-dimensional shape data, is maintained before and after the adjustment.

* * * * *